United States Patent
Thebault et al.

(10) Patent No.: US 8,502,892 B2
(45) Date of Patent: Aug. 6, 2013

(54) PROCESSING DEVICE FOR CORRECTING DEFECT PIXEL VALUES OF AN IMAGE SENSOR UNIT, IMAGE SENSOR UNIT WITH THE PROCESSING DEVICE AND METHOD

(75) Inventors: Cedric Thebault, Villingen-Schwenningen (DE); Sebastien Weitbruch, Kappel (DE); Carlos Correa, Villingen-Schwenningen (DE)

(73) Assignee: Thomson Licensing, Boulogne-Billancourt (FR)

( * ) Notice: Subject to any disclaimer, the term of this patent is extended or adjusted under 35 U.S.C. 154(b) by 861 days.

(21) Appl. No.: 12/452,556

(22) PCT Filed: Jun. 16, 2008

(86) PCT No.: PCT/EP2008/057565
§ 371 (c)(1),
(2), (4) Date: Jan. 8, 2010

(87) PCT Pub. No.: WO2009/007199
PCT Pub. Date: Jan. 15, 2009

(65) Prior Publication Data
US 2010/0110240 A1    May 6, 2010

(30) Foreign Application Priority Data
Jul. 10, 2007    (EP) .................................... 07301218

(51) Int. Cl.
*H04N 9/64*    (2006.01)
(52) U.S. Cl.
USPC ........................................ 348/241; 348/246

(58) Field of Classification Search
USPC ............... 348/241–254, 207.99, 615, E5.034, 348/E5.078; 358/3.26, 3.27, 463; 382/272
See application file for complete search history.

(56) References Cited

U.S. PATENT DOCUMENTS

| 6,426,773 | B1 * | 7/2002 | Suzuki | 348/272 |
|---|---|---|---|---|
| 6,642,960 | B1 * | 11/2003 | Kohashi et al. | 348/246 |
| 2003/0164441 | A1 * | 9/2003 | Lyon et al. | 250/208.1 |
| 2004/0150731 | A1 | 8/2004 | Hara | |
| 2007/0195178 | A1 * | 8/2007 | Ooishi | 348/241 |
| 2008/0019611 | A1 * | 1/2008 | Larkin et al. | 382/287 |

FOREIGN PATENT DOCUMENTS

| EP | 0440563 | 8/1991 |
|---|---|---|
| EP | 0635973 | 1/1995 |

(Continued)

OTHER PUBLICATIONS

Search Report Dated Oct. 7, 2008.

*Primary Examiner* — Lin Ye
*Assistant Examiner* — Euel Cowan
(74) *Attorney, Agent, or Firm* — Tutunjian & Bitetto, P.C.

(57) ABSTRACT

A device for correcting a defect pixel value of a CMOS image sensor unit is proposed, the image sensor unit comprising at least a first and a second pixel array. The image sensor unit is arranged to project the same image onto each pixel array. The correcting device comprises at least a first and a second input channel for receiving pixel values of the first and the second pixel array, respectively. The processing device is operable to replace the defect pixel value by a corrected pixel value, which is determined from values of neighboring pixels to the defect pixel of the same pixel array. The corrected pixel value is evaluated with respect to values of a corresponding pixel and its neighboring pixels of the second pixel array at the same location as the defect pixel of the first pixel array in respect to the projected image.

13 Claims, 9 Drawing Sheets

FOREIGN PATENT DOCUMENTS

| | | |
|---|---|---|
| EP | 1178676 | 2/2002 |
| EP | 1662771 | 5/2006 |
| EP | 1679654 | 7/2006 |
| JP | 6153087 | 5/1994 |
| JP | 2004228931 | 8/2004 |

* cited by examiner

PROCESSING DEVICE FOR CORRECTING DEFECT PIXEL VALUES OF AN IMAGE SENSOR UNIT, IMAGE SENSOR UNIT WITH THE PROCESSING DEVICE AND METHOD

This application claims the benefit, under 35 U.S.C. §365 of International Application PCT/EP2008/057565, filed Jun. 16, 2008, which was published in accordance with PCT Article 21(2) on Jan. 15, 2009 in English and which claims the benefit of European patent application No. 07301218.9, filed Jul. 10, 2007.

The invention relates to a processing device for correcting defect pixel values of an image sensor unit, the image sensor unit and a respective method and, more specifically, to a processing device for correcting of at least one defect pixel value of an image sensor, the image sensor comprising at least a first and a second pixel array, wherein the image sensor unit is embodied to project the same image onto each pixel array, the processing device comprising at least a first and a second input channel for receiving pixel values of the first and the second pixel array, respectively, wherein the processing device is operable to exchange the defect pixel value by a corrected pixel value, wherein the corrected pixel value is estimated by evaluating the values of neighbouring pixels of the defect pixel of the same pixel array, and to the said image sensor and the method.

Image sensors comprise one or more pixel arrays on which an image is projected. For grey-scale images sensors (black-and-white image sensors) one pixel array is sufficient. Colour image sensors usually require more than one pixel array, more precisely, they usually require three pixel arrays, whereby each pixel array is responsible for receiving the information of a colour component of the image. In this connection 3-chip image sensors are known having one chip per colour, whereby the spread of the original incoming image towards these three chips is done by means of prisms and colour filters.

One possible realisation of the image sensor is the so-called CMOS-sensor, which can be produced in the standard CMOS process, which allows integrating on a single chip also other circuits, such as analogue to digital converters (ADC), digital controller for read-out from the CMOS-sensor and sometimes also digital signal processing cores for signal post-processing.

The advantages of the CMOS image sensors are that they use low supply voltages and that they can be fabricated at low cost due to the possible integration of the other circuits on one single chip.

But CMOS image sensors are often suffering from fixed pattern noise and random defect pixels, whereby the pixel defects in an imager are seen as spot noise. In a CMOS image sensor for example, the white spots on a dark portion of the image are due to pixels with excessive leakage current and the dark spots on a white portion of the image due to either a particle covering the pixel or a defect in the pixel electronics causing the pixel to be insensitive. Defect pixels are mainly created during manufacturing, some more can occur with time. This spot noise strongly degrades image quality. However, for economical reasons and in order to increase the manufacturing yield, some random defective pixels are usually accepted even for professional devices. In this case, the defect pixels are corrected by signal processing.

It is a general desire in the art to improve the correcting of the defect pixel values of images sensors in order to enhance image quality.

This object is achieved by a processing device with the features of claim 1, by an image sensor unit with the features of claim 15 and by a method with the features of claim 21. Advantageous or preferred embodiments of the invention are disclosed in the dependent claims, the description and the figures.

According to the invention, a processing device is presented, which is capable to correct at least one defect pixel value of an image sensor unit. In general the processing device allows to correct the values of especially bonded or clustered areas of defect pixels, but it is preferred that the processing device is embodied to correct a bonded area with only one single defect pixel as sensor units with larger clustered areas of defect pixels are preferably sorted out during fabrication.

The image sensor unit is of based on any technology like CMOS or CCD and comprises at least two two-dimensional pixel arrays for sensing impinging light, the pixel arrays being arranged on one or more chips. The image sensor unit is realised so that an incoming image is projected in parallel onto the at least two pixel arrays, wherein the at least two pixel areas receive the same spatial image sections. The expression "image" is herein used as a two-dimensional array of light intensity and may be but is not restricted to a real image.

The processing device shows corresponding to the at least two pixel arrays a respective number of input channels for receiving the read-out values from the at least two pixel arrays.

In general the processing device is adapted to exchange the at least one defect pixel by a corrected value in order to correct the defect pixel value. The corrected pixel value is generated by evaluating the values of the neighbouring pixels of the same pixel array as the defect pixel and—according to the invention—by evaluating the values of a corresponding pixel and its neighbouring pixels of the second pixel and optionally of a third pixel array, wherein the corresponding pixel is positioned at the same location as the defect pixel with respect to the projected image. The expression neighbouring pixel is directed to pixels, which are positioned adjacently and/or in the surrounding and/or as direct neighbours to the defect pixels or to the corresponding pixel, respectively.

One finding of the invention is that using of information of the neighbourhood of the defect pixel in one pixel array combined with the information of the pixels at the same location but in the other array or arrays allows to recreate the missing information of the defect pixel with only very few or as less artefacts as possible. Especially in view of real images there is usually a lot of similitude between the information from the various pixel arrays, so that structural or statistical features are at least similar at the same locations in the various pixel arrays. Thus using information of the corresponding pixels in the other arrays is a way of improving the quality of the corrected pixel value.

In a preferred embodiment, the processing device comprises a third input channel for receiving pixel values of a third pixel field of the image sensor. This embodiment allows the processing device to cooperate with image sensor units having three pixel arrays, whereby each of the pixel arrays is embodied to receive one colour component of the incoming image. A wide-spread colour distribution and thus a preferred realisation is the RGB-colour scheme. However, the invention is in general not restricted to the RGB-distribution but can handle any kind of image sensors units with multiple pixel fields.

In yet a further preferred embodiment of the invention the processing device is adapted to evaluate the values of the neighbouring pixels of the defect pixel by directional interpolation operations, i.e. interpolation operations which are direction optimised. Directional interpolation operations are characterised in that various directional interpolation operations results in various interpolation values due to the structural features of the values of the neighbouring pixel values of the defect pixel. In one possible realisation the interpolation operations are performed along lines, whereby the lines are arranged in a vertical (column), horizontal (row), first diagonal and/or second diagonal direction. In a very simple and thus advantageous realisation, the directional interpolations are performed as an average operation between the values of the next and diametrically lying neighbours of the defect pixel. One possible advantage of employing the directional interpolation operations is that thin structures and the like of the image are not degraded.

In a possible development of the invention the processing device is adapted to use values of the corresponding pixel and its neighbouring pixels of the second and optionally of the third pixel array to derive a confidence value for each of the directional interpolation operation results, the confidence value being a quantity for the quality of the respective directional interpolation operation. Furthermore the processing device is operable to evaluate the values of the neighbouring pixels of the defect pixels and/or the results of the directional interpolation operations in a weighted manner.

In order to improve the significance of the confidence value it is preferred that the confidence values are derived by a directional evaluation of the values of the corresponding pixel and its neighbouring pixels. Especially the confidence values are derived by a line-wise evaluation, whereby the lines are parallel or congruent to the lines of the corresponding or respective directional interpolation operation.

In a possible practical realisation the confidence values are derived by calculating the mean value between the two next neighbours of the corresponding pixel, which are lying diametrically on a line parallel or congruent to the line of the directional interpolation operation. In a next step, the mean value is subtracted from the value of the corresponding pixel. In an optional further step the result of the respective interpolation operation is added.

For estimating the corrected pixel value the processing device is preferably adapted to combine the various directional interpolation results in dependence on the corresponding confidence value, for example in a weighted manner.

A further subject-matter of the invention is a image sensor unit with the features of claims 10. The images sensor unit comprises three pixel arrays, which are preferably distributed on three chips, so that the image sensor unit is a 3-chip camera having one chip per colour. The image sensor unit comprises or is connected with means for spreading an original incoming image into three partial images, each representing one colour component, red-green-blue (RGB), of the original image. The means for spreading are preferably realised as a combination of prisms and colour filters. As a result the same image region is projected onto each pixel array.

According to the invention the image sensor unit comprises the processing device as claimed in the preceding claims and/or as described above.

In a preferred embodiment, the image sensor unit is based on CMOS-technology, so that the pixel arrays are arrays of basic pixel cells manufactured in CMOS-technology each comprising for example a photodiode and three transistors. Optionally the processing unit is also manufactured in CMOS-technology and/or arranged as an additional circuit on one of the pixel array chips and/or on another chip.

From a structural point of view, the processing device and/or the image sensor unit comprises a plurality of directional interpolators for interpolating the defect pixel value. In this connection it is preferred that the directional interpolators comprise also means for calculating the confidence values.

In an optional realisation, the processing device and/or the image sensor unit comprises a soft switch block, which is operable to mix the results of the interpolation operation depending on the respective confidence values to calculate the corrected pixel value.

A replacement switch block is optionally provided, wherein the replacement switch block is operable to exchange or replace the defect pixel value with the corrected pixel value.

Furthermore means for detecting defect pixel and/or defect pixel values are implemented in the processing unit and/or the image sensor unit.

Yet a further subject-matter of the invention is a method for correcting defect pixel values with the features of claim 16, which is preferably carried out on the processing device and/or the images sensor unit of the preceding claims or description. The method comprises the steps of calculating directional interpolation values of a defect pixel value by evaluating neighbouring pixel values, the neighbouring pixels being arranged in the surrounding of the defect pixel in a same first pixel array; estimating a confidence value for each interpolated value by evaluating the values of a corresponding pixel and its neighbouring pixels, the corresponding pixel being arranged at the same image location in a second pixel array; mixing the interpolated values in dependence on the confidence values in order to generate a corrected pixel value and exchanging the defect pixel value with the corrected pixel value.

Further features, advantages and/or effects of the invention are disclosed by the following detailed description of preferred embodiments of the invention and the figures, which show.

In the following description the same or the like reference numerals designate the same or the like parts.

Figure 1:
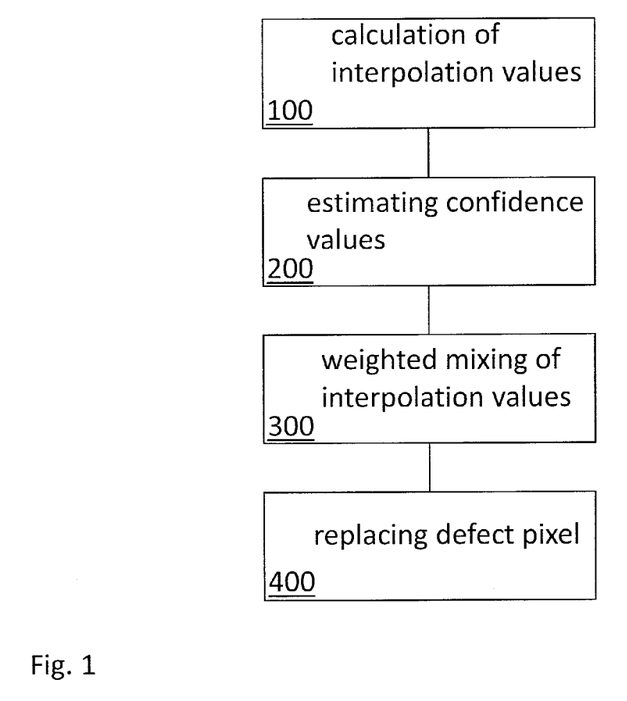
FIG. 1 a flow-diagram as an embodiment of a method according to the invention.

FIG. 1 is a flow diagram illustrating a method for correcting a defect pixel value of an image sensor as a first embodiment of the invention. The method is carried out in connection with a 3-chip-CMOS camera (not shown), whereby the colour components of an incoming image are distributed, for example by means of prisms and colour filters, onto three chips, each carrying a pixel array with a two-dimensional field of basic pixel cells, which comprise a light sensitive element, like a photodiode, and a basic readout circuit with for example three transistors.

Due to the manufacturing process or during life time, some of the basic pixel cells are or become defective and create spot noise on the output image of the 3-chip-CMOS camera. Roughly spoken, two different types of spot noise often occur, which are dead/dark pixels due to a particle covering the pixel or a defect in the pixel electronics, causing the pixel to be insensitive, and leaking pixels, which are white spots on a dark portion of the image due to pixels with excessive leakage current.

The objective of the method as illustrated in FIG. 1 is to interpolate such defect pixels in order to deliver an output image free of visible defects out of the 3-chip-CMOS camera. This is achieved by using information of the neighbourhood of a defect pixel for one colour combined with the information of the pixels at the same location but in the other colours in order to recreate the missing information of the defect pixel.

Figure 2:
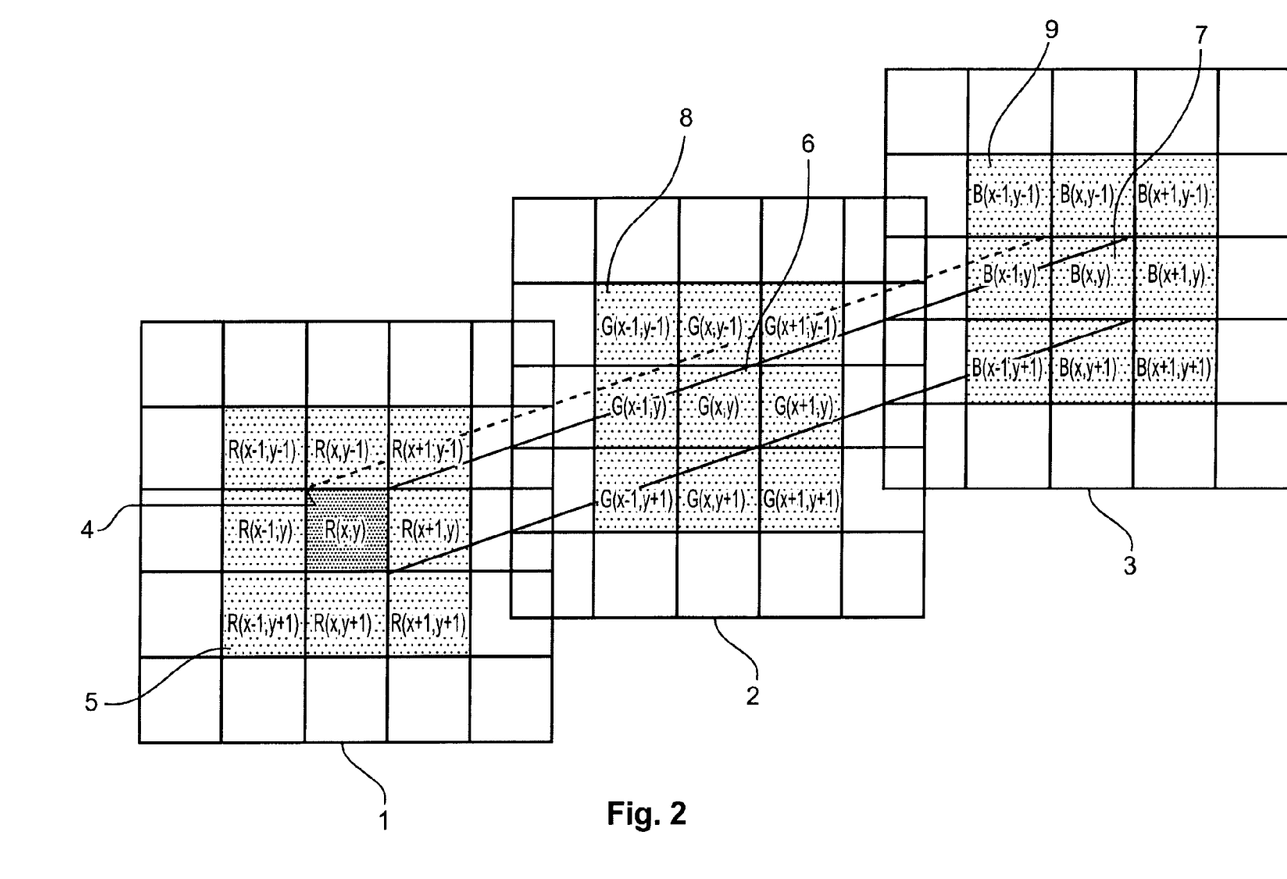
FIG. 2 a schematic illustration of three pixel arrays of a 3-chip-camera for defining some expressions in connection with the method in FIG. 1.

Reference is now made to FIG. 2 showing schematically a first, a second and third pixel array 1, 2 and 3, each representing one of the chips of the 3-chip-CMOS camera. The first pixel array 1 is adapted to receive the red component, the second pixel array 2 is adapted to receive the green component and the third pixel array is adapted to receive the blue component from an incoming original image, which is split up in its RGB-components. Now and in the following it is assumed that the pixel at the position R(x,y) in the first pixel array is a defect pixel 4. However, each other pixel in each other pixel array could be used in an analogue manner.

For matter of definition the pixels surrounding the defect pixel 4 in the same first pixel array 1 are named neighbouring pixels 5 and are referenced by the positions from R(x−1, y−1) to R(x+1, y+1). The pixels of the other two pixel arrays 2, 3 at the same location are named corresponding pixels 6, 7 and are referenced by the positions G(x,y) and B(x,y) respectively. The pixels surrounding the corresponding pixels 6,7 are named neighbouring pixels 8, 9, respectively, and are defined in an analogue manner as the neighbouring pixels 5.

The expression that pixels of various pixel arrays are at the same location means that these pixels together form a RGB-image point of an output image.

Figure 3:
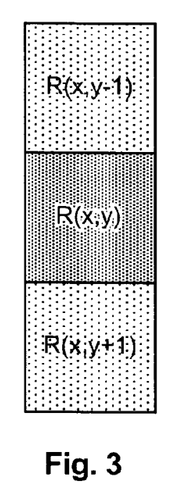
FIGS. 3 to 6 schematic illustrations for explaining the interpolation step and the calculation of confidence value step in FIG. 1.
Figure 4:
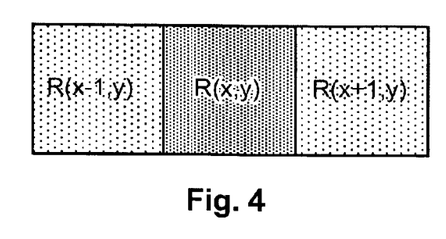
Figure 5:
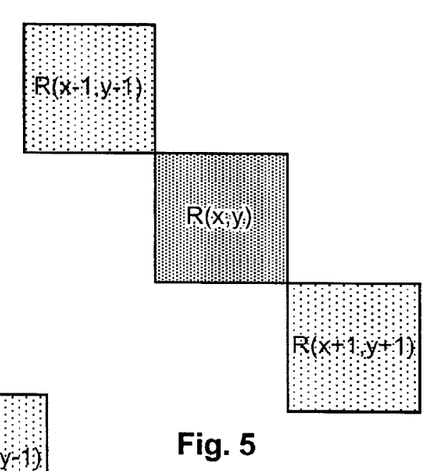
Figure 6:
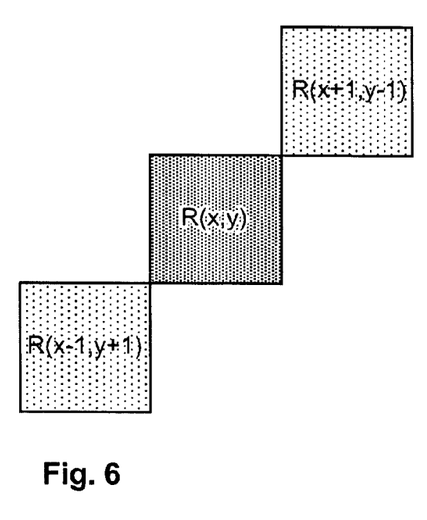

Returning now to FIG. 1, the first step 100 of the method is the calculation of directional interpolation values for the defect pixel 4 by evaluating the neighbouring pixels 5. For the calculation of the directional interpolation values the four main directions are evaluated, which are according to FIG. 3 a vertical interpolation, according to FIG. 4 a horizontal interpolation, according to FIG. 5 a first diagonal interpolation and according to FIG. 6 a second diagonal interpolation. Each directional interpolation is carried out by calculating the mean value of the values of two pixels of the neighbouring pixels 5, whereby the said two pixels lay on a line of the respective main direction and surround the defect pixel 5. For the vertical direction the mean value of the pixels with the positions R(x,y−1) and R(x,y+1) is calculated as the directional interpolation value.

In a second step 200 a confidence value for each directional interpolation value is estimated by evaluating the values of the corresponding pixels 6, 7 and the neighbouring pixels 8, 9 of the second and third pixel array 2, 3. As an example the confidence value for the vertical interpolation value is estimated by the formula:

$$\text{vert\_confidence} = \text{abs}(G(x,y) - (G(x,y-1) + G(x,y+1))/2) + \text{abs}(B(x,y) - (B(x,y-1) + B(x,y+1))/2) + \text{abs}(R(x,y-1) - R(x,y+1))/2)).$$

The confidence values concerning the other main directions are calculated in an analogue manner. The smaller the value of vert_confidence is, the bigger the confidence in the interpolated value in this direction.

In a third step 300 the results of the directional interpolation operation are mixed in a weighted manner in dependence on the confidence values. This operation is also performed to avoid blinking pixels. The mixing operation is performed stepwise, whereby in a first step two directional interpolation values are mixed, respectively, and in a second step the resulting two intermediate values are mixed. As a result of the mixing operation a corrected pixel value is output. For details of the mixing operation, reference is made to FIG. 10 and FIG. 11.

In a fourth step 400, the defect pixel value is replaced by the corrected pixel value, so that the output image comprises instead of defect pixel values the estimated corrected pixel values thus improving significantly the quality of the output image.

Figure 7:
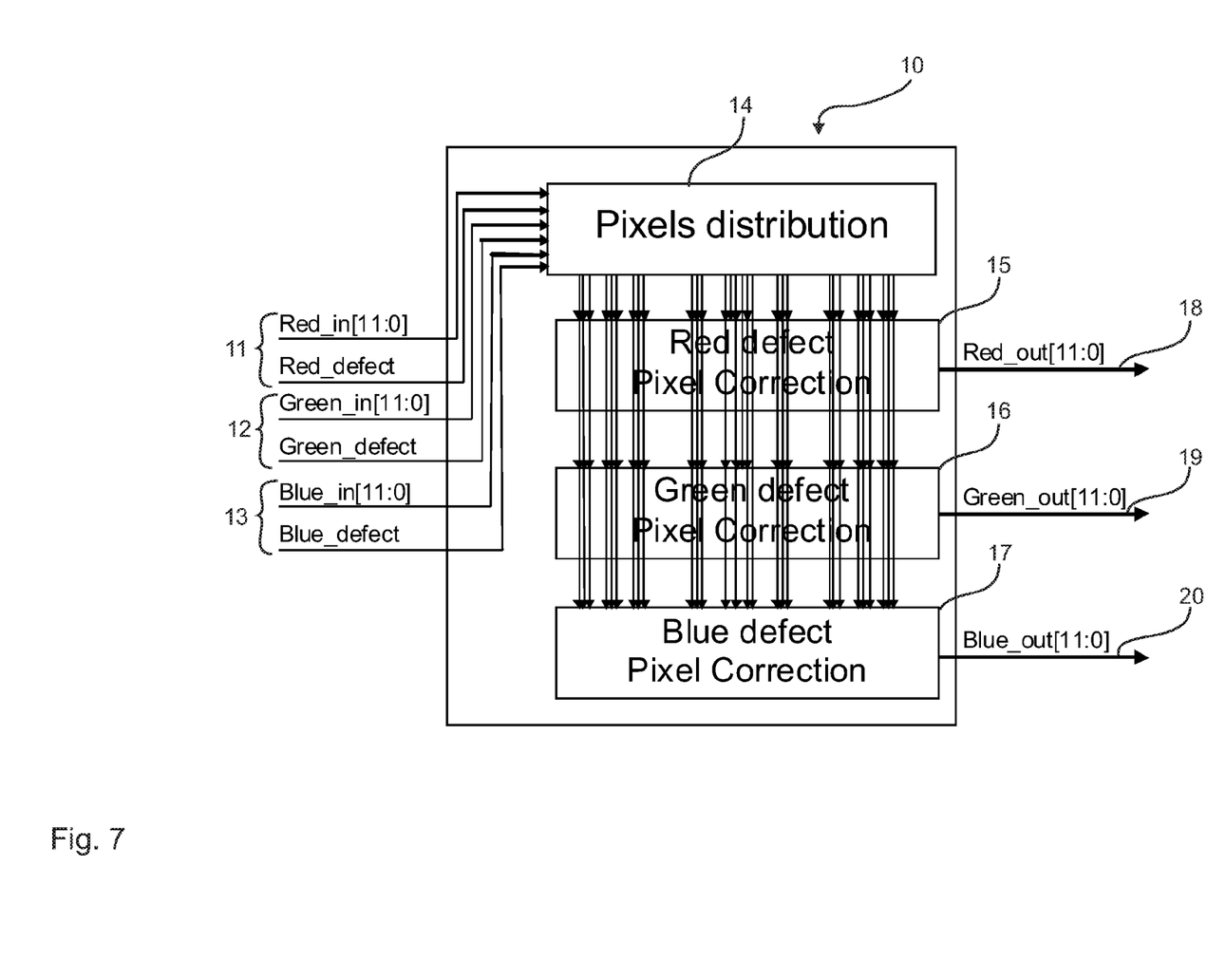
FIG. 7 a schematic block diagram of a processing device as an embodiment of the invention, which can be used in connection with the method in FIG. 1.

FIG. 7 shows a first embodiment of a processing device 10 as a schematic block diagram. The processing device is for example realised in CMOS-technology and is part of the above-mentioned three-chip-camera. The processing device 10 comprises three input channels 11, 12, 13, whereby the first input channel 11 is adapted for receiving the red pixel values of the first pixel array 1, the second input channel 12 is adapted for receiving the green pixel values of the second pixel array 2 and the third input channel 13 is adapted for receiving the blue pixel values of the third pixel array 3. Each of the channels is divided in an information section, for example Red_in[11:0], for receiving 12-Bit pixel values and in an error section, for example Red_defect, for receiving a 1-Bit value (this signal is equal to 1 when the corresponding pixel is defect, to 0 otherwise) for a defect pixel.

The input signals are sent to a pixel_distribution block 14, which is basically a memory. Next the pixel values are guided to one of the defect_pixel_correction blocks 15, 16, 17, whereby each block receives 26 pixel values for generating corrected pixel values. The red_defect_pixel_correction block 15 for example receives in the situation of FIG. 2 the 8 values of the neighbouring pixels 5, 8 and 9, respectively (i.e. 24 values) and the 2 values of the corresponding pixels 6 and 7 (i.e. 2 values). As already explained in connection with FIG. 1, the defect pixel value(s), for example defect pixel 4, are replaced by the corrected pixel values and sent to output channels 18, 19 and 20 of the processing device 10, whereby the signals of the output channels 18, 19 and 20 show instead of defect pixels values the replaced corrected pixel values.

Figure 8:
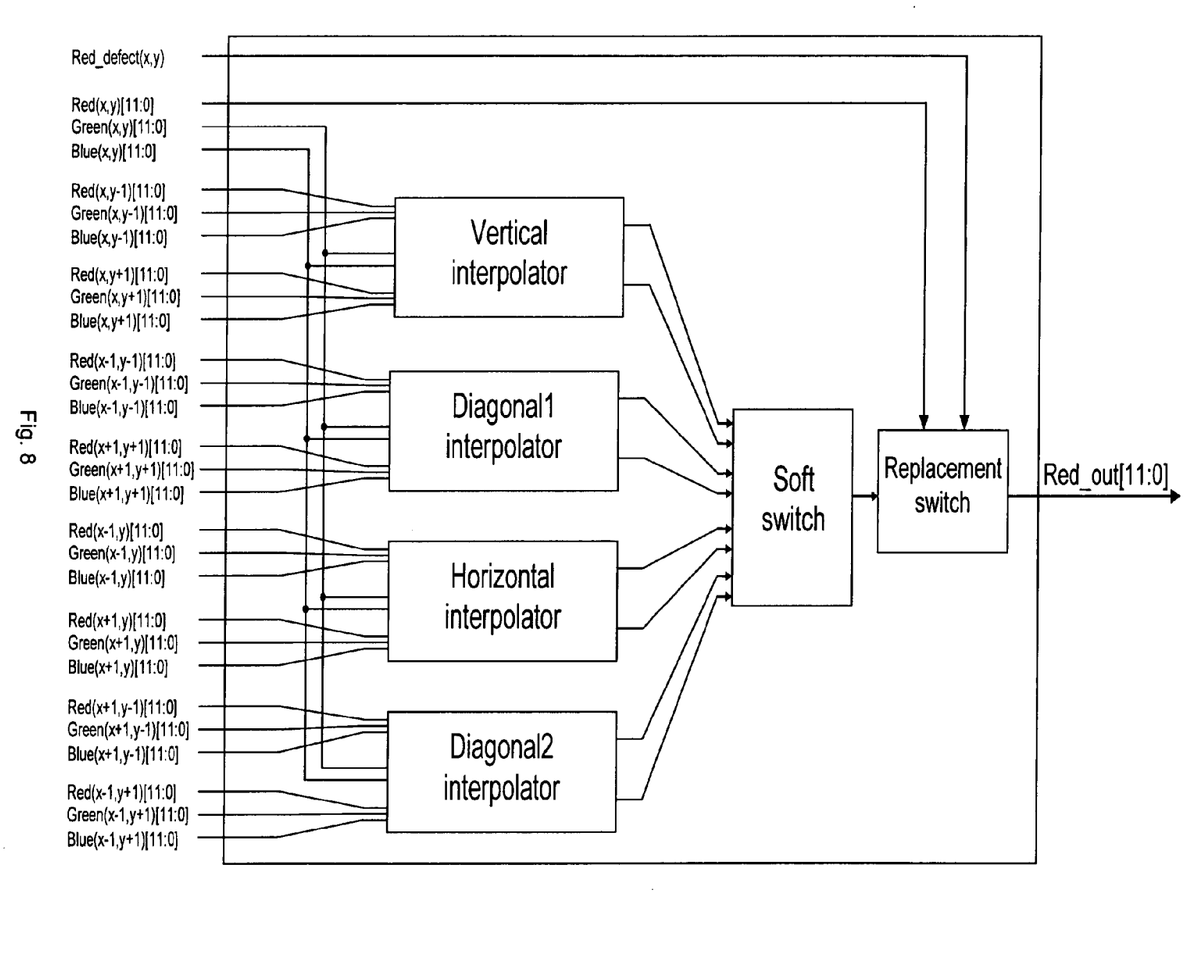
FIG. 8 a more detailed schematic block diagram of one of the defect_pixel_correction blocks in FIG. 7.

FIG. 8 shows the red_defect_pixel_correction block 15 in a more detailed schematic block diagram. The green_defect_pixel_correction block 16 and the blue_defect_pixel_correction block 17 are constructed in an analogue manner.

The red_defect_pixel_correction block 15 is composed by four identical direction_interpolator blocks 21, 22, 23, 24, which generate interpolation values for the respective direction, and confidence values corresponding to the confidence to the interpolation values as explained in connection with FIGS. 3 to 6. A soft_switch 25 mixes the different interpolation values depending on the confidence values especially in order to avoid blinking pixels. A replacement_switch block 26 only switches between the input value and the corrected value depending on the red_defect(x,y) bit.

Figure 9:
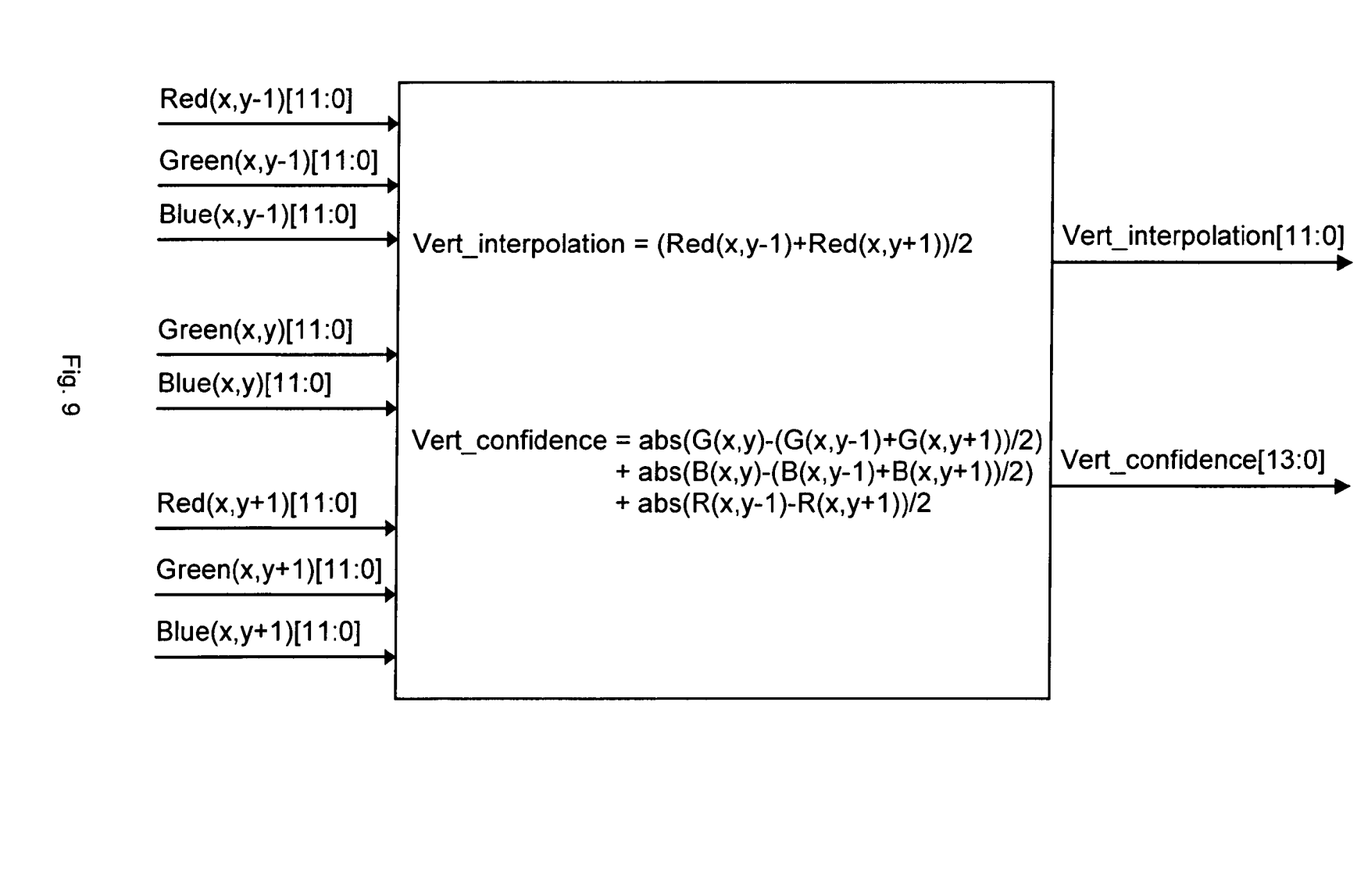
FIG. 9 a more detailed schematic block diagram of one of the interpolator blocks in FIG. 8.

FIG. 9 illustrates the verticular_interpolator block 21 in a more detailed presentation also as a block diagram. The other interpolators 22, 23, 24 are—besides the inputs—identical or analogue, so that by means of example only the red_vertical_interpolator is described. The verticular_interpolator block 21 generates an interpolation value vert_interpolation [11:0], which is an average between two neighbour pixels (see also FIG. 3) in the interpolation direction. A vert_confidence [13:0] value is calculated by the formula as already explained above. In order to save some operations, some results can be shared by the different direction_interpolator blocks 21, 22, 23, 24: For example if the interpolation values of Red_vertical_interpolator, Green_vertical_interpolator and Blue_vertical_interpolator are calculated, these values can be used for the computation of Red_vertical_confidence. Also the value abs(G(x,y)−(G(x,y−1)+G(x,y+1))/2) can be used for the computation of Red_vertical_confidence and the computation of Blue_vertical_confidence. So only one of the values abs(G(x,y)−(G(x,y−1)+G(x,y+1))/2) and abs(B(x,y)−(B(x,y−1)+B(x,y+1))/2) could be computed in this block. For example if abs(G(x,y)−(G(x,y−1)+G(x,y+1))/2) should be computed (which is equal to abs(G(x,y)−Green_vertical_interpolation)), the value of abs(B(x,y)−(B(x,y−1)+B(x,y+1))/2) can be used, which is computed in the Green_vertical_interpolator. The output values of the verticular_interpolator block 21 and the other interpolators 22, 23, 24 are fed into the soft_switch 25, which is shown in detail in FIG. 10.

Figure 10:
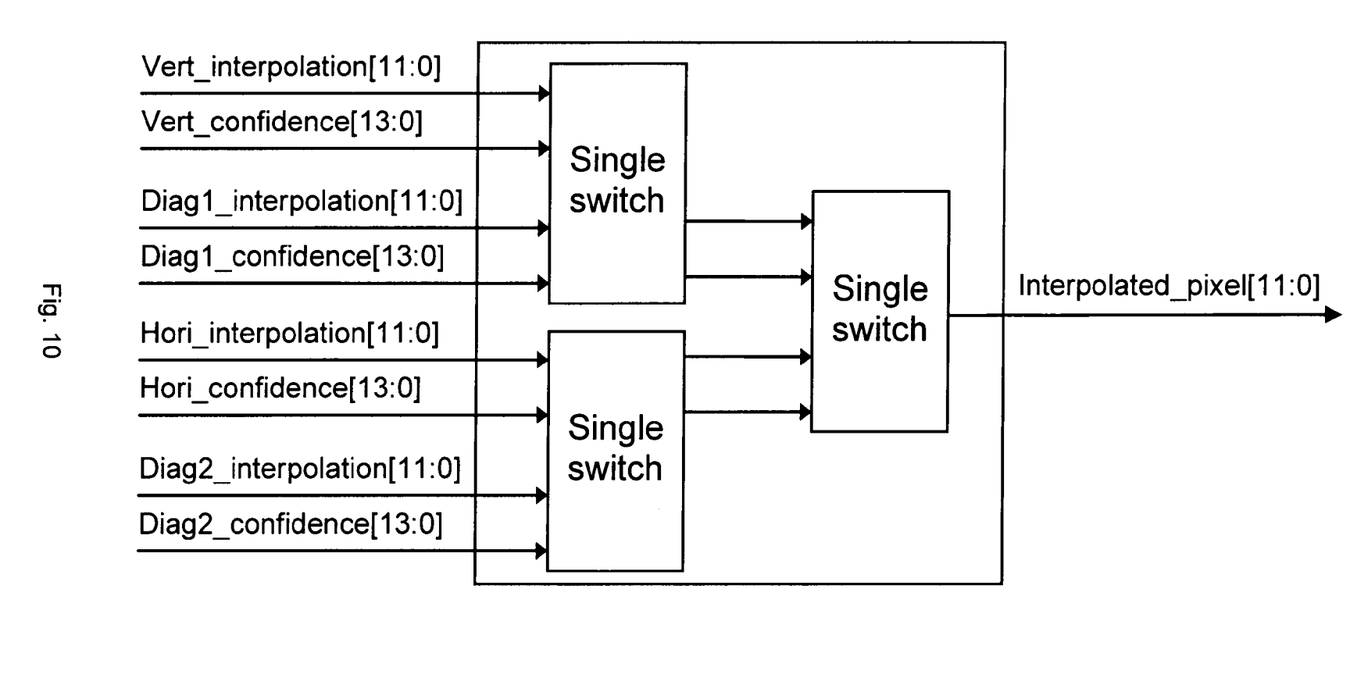
FIG. 10 a more detailed schematic block diagram of the soft_switch block in FIG. 8.

The soft_switch 25 in FIG. 10 merges or mixes the interpolated values from the interpolators 21, 22, 23, 24 in dependence on the confidence values. The mixing operation is done stepwise, whereby in a first step in a first single switch block 27 the interpolated values from the vertical interpolator 21 and from the diagonal1_interpolator 22 are mixed. In a second single switch block 28 parallel to the first single switch block 27 the interpolated values from the horizontal_interpolator 21 and from the diagonal2_interpolator 22 are mixed. Each of the single switch_blocks 27 and 28 generates an intermediate interpolated value and an intermediate confidence value, which are guided into a third single switch block 29. The third single switch 29 mixes the intermediate interpolated into the corrected pixel value interpolated_pixel [11:0], which is then guided to the replacement switch block 26. The mixing operation in the single_switch blocks 27, 28 and 29 is explained by means of example for the first single_switch block 27 in connection with FIG. 11.

Figure 11:
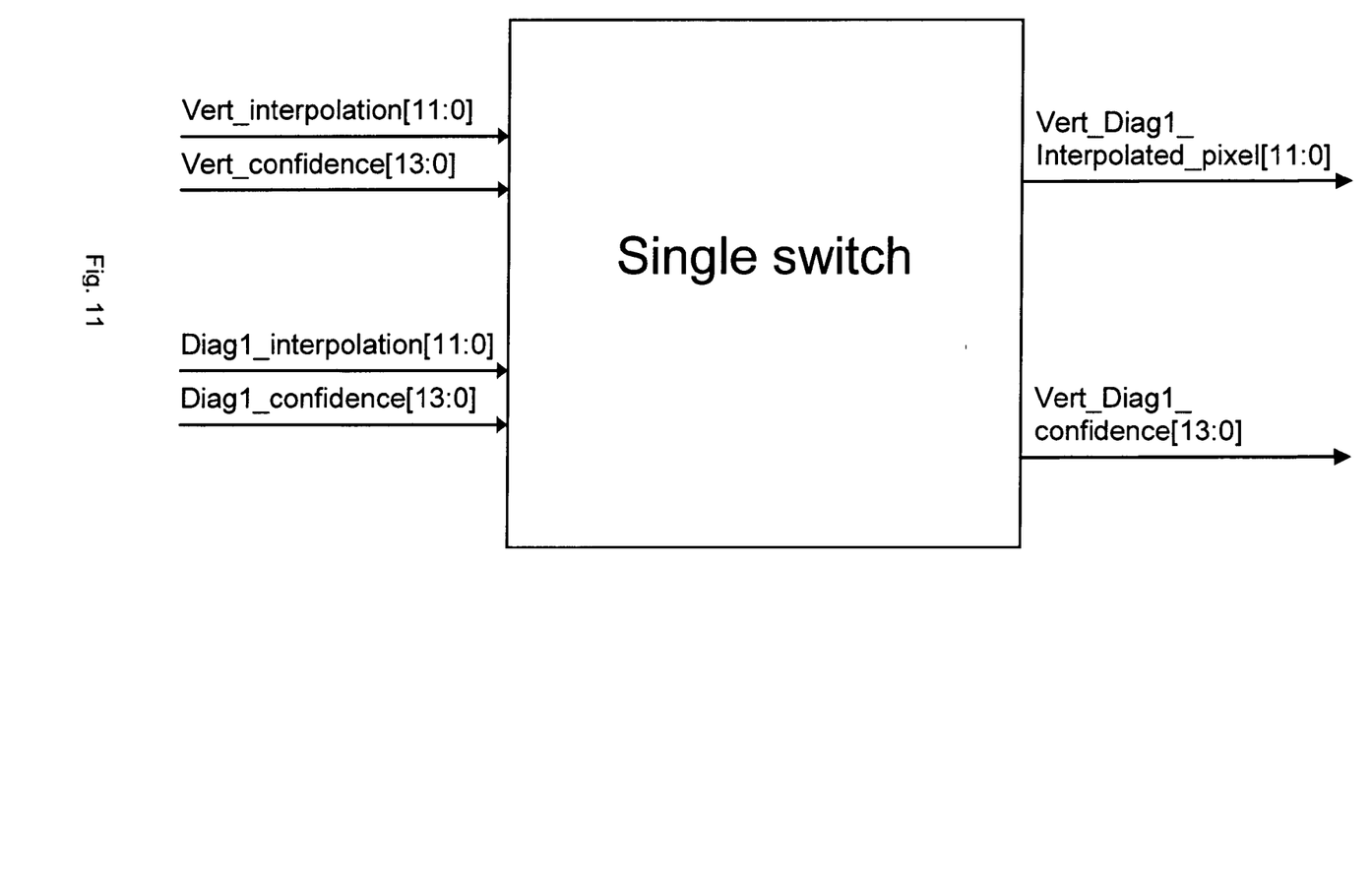
FIG. 11 a more detailed schematic block diagram of one of the single_switch blocks in FIG. 10.

As shown in the schematic block diagram in FIG. 11, the first single_switch block 27 receives the value vert_interpolation [11:0] from the vertical interpolator 21, the respective confidence value vert_confidence [13:0], the value diag1_interpolation [11:0] from the diagonal1_interpolator 22 and the respective confidence value diag1_confidence [13:0] as input values. As output values, the first single_switch block generates an intermediate interpolated value vert_diag1_interpolated_pixel[11:0] and a respective confidence value vert_diag1_confidence[13:0].

The intermediate interpolated value vert_diag1_interpolated_pixel is equal to the median value of:
 vert_interpolation,
 diag1_interpolation and
 (Vert_interpolation+diag1_interpolation)/2—sign (vert_interpolation−diag1_interpolation)*(vert_confidence−diag1_confidence)
 (the median of 3 values is the value which lies between the other two)
 This means that the intermediate interpolated value vert_diag1_interpolated_pixel lies between the two input values (vert_interpolation and diag1_interpolation). If the two confidence values are equal this intermediate interpolated value is equal to the average of these two input values, otherwise the intermediate interpolated value is closer (or equal) to the input value having the smaller confidence value.

vert_diag1_confidence is equal to the minimum of the two confidence values. (The third single switch block 29 does not need this computation since this value will not be used).

Figure 12:
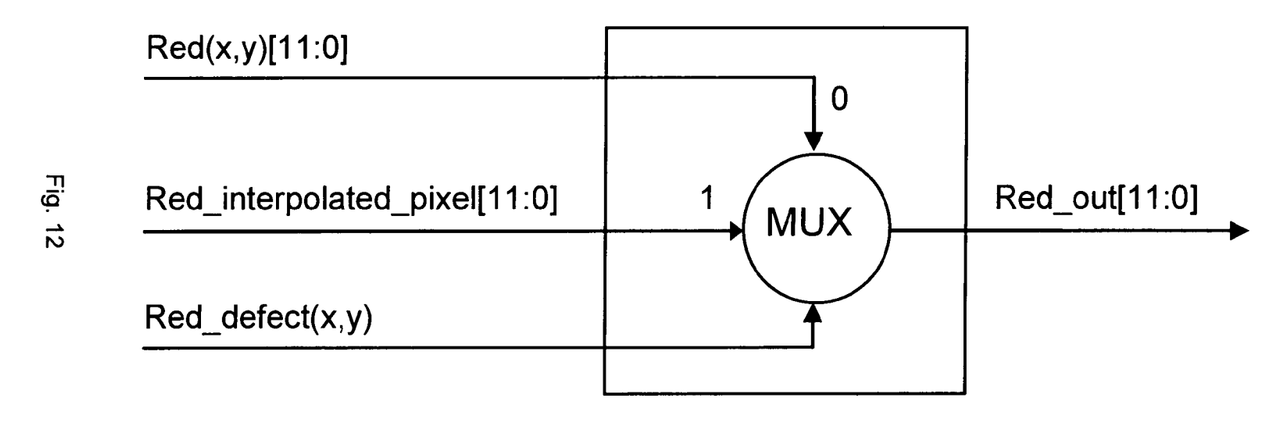
FIG. 12 a more detailed schematic block diagram of the replacement_switch block in FIG. 8.

The replacement switch block 29 receives the corrected pixel value interpolated_pixel [11:0] or in the discussed example red_interpolated_pixel[11:0] as an input value. Additionally the read out value of the pixel in question is and the error section red_defect (x,y) of the input channel 11 are defined as input value. In dependence on the error signal red_defect (x,y), the replacement switch block 29 gives out the uncorrected pixel value (in case red_defect (x,y)=0, i.e. no defect pixel) or the corrected pixel value red_interpolated_pixel[11:0] (in case red_defect (x,y)=01, i.e. defect pixel).

The invention claimed is:

1. An apparatus for correcting of at least one defect pixel value of an image sensor unit, the image sensor unit comprising at least a first and a second pixel array, wherein the image sensor unit is arranged to project representations of substantially the same image onto each pixel array, the apparatus comprising:
 at least a first and a second input channel for receiving pixel values of at least the first and second pixel array, respectively, wherein the apparatus is operable to replace a defect pixel value of the first pixel array with a corrected pixel value,
 wherein the apparatus is operable to determine a set of candidate pixel values from the values of neighboring pixels to the defect pixel of the first pixel array by means of directional interpolation operations, the directional interpolation operations being performed along lines that are arranged in a vertical, horizontal first diagonal and/or second diagonal direction,
 wherein the apparatus is further operable to determine, for each one of the set of candidate pixel values, and in corresponding parallel or congruent interpolation directions, confidence values from values of a corresponding pixel and its neighboring pixels of the second pixel array at the same pixel location as the defect pixel of the first pixel array with respect to the projected image,
 wherein the apparatus is further adapted to combine the candidate values to a corrected pixel value in a weighted manner in dependence on the corresponding confidence values.

2. The apparatus of claim 1, further comprising a third input channel for receiving pixel values of a third pixel array of the image sensor unit.

3. The apparatus of claim 2, wherein the three input channels represent three colour channels, preferably receiving pixel values corresponding to red, green and blue components of an image.

4. The apparatus of claim 1, wherein the confidence values are a quantity indicative of the quality of the respective directional interpolation.

5. The apparatus of claim 1, wherein the confidence values are derived by calculating the mean value between the two next neighbors of the corresponding pixel, which are lying diametrically on a line parallel or congruent to the line of the directional interpolation operation and by subtracting the mean value from the value of the corresponding pixel.

6. The apparatus of claim 1, wherein the respective confidence values represent the difference of the values of the corresponding pixel and the neighboring pixel of the corresponding pixel in the interpolation direction.

7. An image sensor unit comprising a first, a second and a third pixel array, wherein the image sensor is adapted to project the same image region onto each of the three pixel arrays, wherein the image sensor unit comprises an apparatus according to claim 1.

8. The image sensor unit of claim 7, wherein the pixel arrays are of the CMOS-sensor type.

9. The image sensor unit of claim 7, further comprising a plurality of directional interpolators for interpolating the defect pixel value.

10. The image sensor unit of claim 9, wherein the directional interpolators are operable to calculate confidence values.

11. The image sensor unit of claim 9, further comprising a soft switch block operable to mix the results of the directional interpolators depending on the respective confidence values in order to generate the corrected pixel value.

12. The image sensor unit of claim 7, further comprising a replacement switch block operable to replace the defect pixel value with the corrected pixel value.

13. A method for correcting defect pixel values of a first pixel array of an image sensor unit, the image sensor unit further comprising at least a second pixel array, wherein the image sensor unit is arranged comprising the steps of:

Determining a set of candidate pixel values from the neighboring pixels of the defect pixel of the first pixel array through directional interpolation operations, the directional interpolation operations being performed along lines that are arranged in a vertical, horizontal first diagonal and/or second diagonal direction, determining for each one of the set of candidate pixel values, an in corresponding parallel or congruent interpolation directions, confidence values of a corresponding pixel and its neighboring pixels of the second pixel array, at the same pixel location as the defect pixel of the first array with respect to an image projected onto the pixel arrays, combining the candidate values to a corrected pixel value in a weighted manner depending on the corresponding confidence values for generating a corrected pixel value, and replacing the defect pixel value with the corrected pixel value.

\* \* \* \* \*